(12) United States Patent
Choi et al.

(10) Patent No.: US 9,020,515 B2
(45) Date of Patent: Apr. 28, 2015

(54) COMMUNICATION SYSTEM OF PERFORMING UPLINK COMMUNICATION AND DOWNLINK COMMUNICATION USING OVERLAPPING RADIO RESOURCE

(75) Inventors: Hyun Ho Choi, Suwon-si (KR); Kyung Hun Jang, Suwon-si (KR); Chang Yong Shin, Seoul (KR); Won Jong Noh, Yongin-si (KR); Won Jae Shin, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 892 days.

(21) Appl. No.: 12/961,713

(22) Filed: Dec. 7, 2010

(65) Prior Publication Data

US 2011/0195704 A1 Aug. 11, 2011

(30) Foreign Application Priority Data

Feb. 9, 2010 (KR) ........................ 10-2010-0011847

(51) Int. Cl.
*H04W 72/12* (2009.01)
*H04W 28/04* (2009.01)
*H04W 72/04* (2009.01)
*H04W 72/08* (2009.01)

(52) U.S. Cl.
CPC .......... *H04W 72/1263* (2013.01); *H04W 28/04* (2013.01); *H04W 72/04* (2013.01); *H04W 72/082* (2013.01)

(58) Field of Classification Search
CPC ..... H04W 28/04; H04W 72/04; H04W 72/82; H04W 72/1283; H04W 56/004; H04W 56/0055
USPC .......... 455/450–455, 427; 370/280, 281, 295, 370/329; 375/133
See application file for complete search history.

(56) References Cited

U.S. PATENT DOCUMENTS

| | | | |
|---|---|---|---|
| 8,130,879 B2 * | 3/2012 | Huang | 375/346 |
| 2006/0262750 A1 * | 11/2006 | Walton et al. | 370/329 |
| 2007/0041347 A1 | 2/2007 | Beale et al. | |
| 2008/0002658 A1 | 1/2008 | Soliman | |
| 2008/0287124 A1 * | 11/2008 | Karabinis | 455/427 |
| 2009/0086670 A1 | 4/2009 | Hart et al. | |
| 2009/0279587 A1 * | 11/2009 | Eriksson et al. | 375/133 |

FOREIGN PATENT DOCUMENTS

| | | |
|---|---|---|
| KR | 10-2005-0059057 | 6/2005 |
| KR | 10-2007-0029042 A | 3/2007 |

(Continued)

OTHER PUBLICATIONS

International Search Report issued Sep. 30, 2011 in counterpart International Application no. PCT/KR2011/000386 (4 pages, in English).

*Primary Examiner* — Nizar Sivji
(74) *Attorney, Agent, or Firm* — NSIP Law

(57) ABSTRACT

A communication system performs an uplink communication and a downlink communication using respective radio resources that at least partially overlap each other in both time and frequency, which may cause interference to occur in at least one downlink terminal due to at least one uplink terminal. The at least one uplink terminal and the at least one downlink terminal may process the interference according to a rate split scheme, an interference control scheme, and the like. Interference occurring between at least one transmit antenna and at least one receive antenna of a base station may be processed according to an echo cancellation scheme and the like.

27 Claims, 13 Drawing Sheets

(56) References Cited

FOREIGN PATENT DOCUMENTS

| KR | 10-2009-0003946 A | 1/2009 |
|----|-------------------|--------|
| KR | 10-2009-0005676 A | 1/2009 |
| KR | 10-2009-0037756 A | 4/2009 |
| WO | WO 2005/050852 A2 | 6/2005 |
| WO | WO 2005/084045 A1 | 9/2005 |

* cited by examiner

FIG. 2
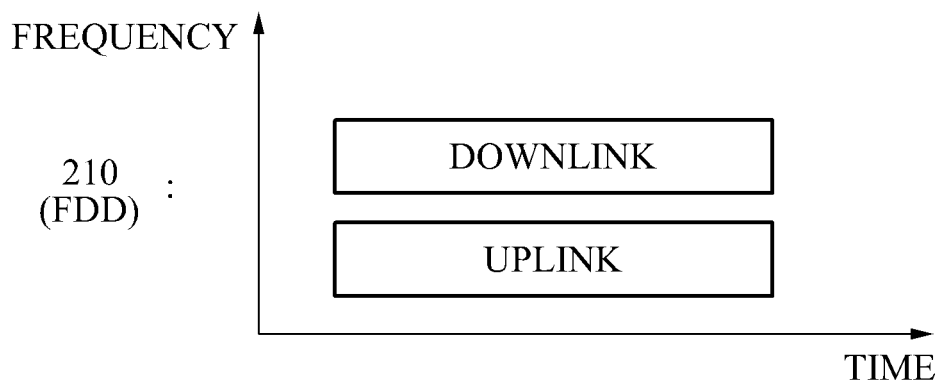
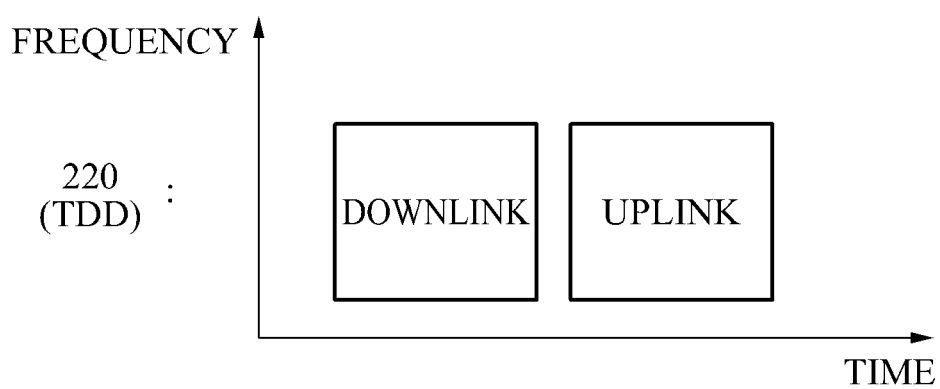

FIG. 4

WEAK INTERFERENCE ⟶ ITN SCHEME

STRONG INTERFERENCE ⟶ COMPLETE INTERFERENCE CANCELLATION SCHEME

INTERMEDIATE INTERFERENCE ⟶ PARTIAL INTERFERENCE CANCELLATION SCHEME (HAN-KOBAYASHI SCHEME)

FIG. 8
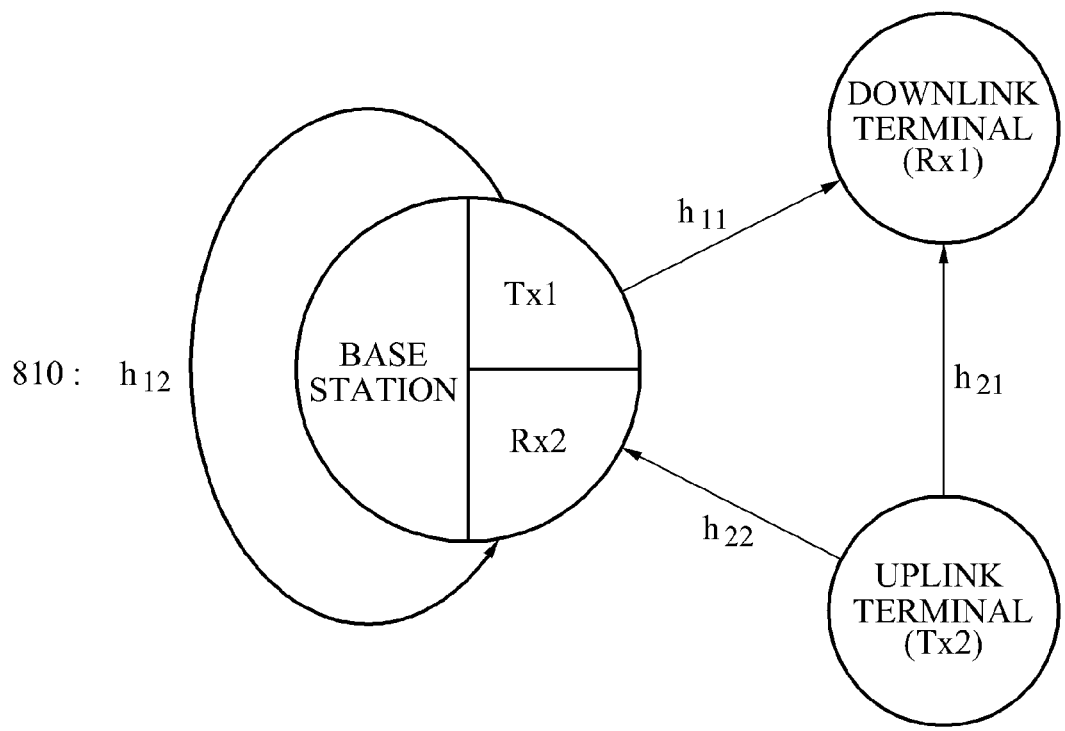
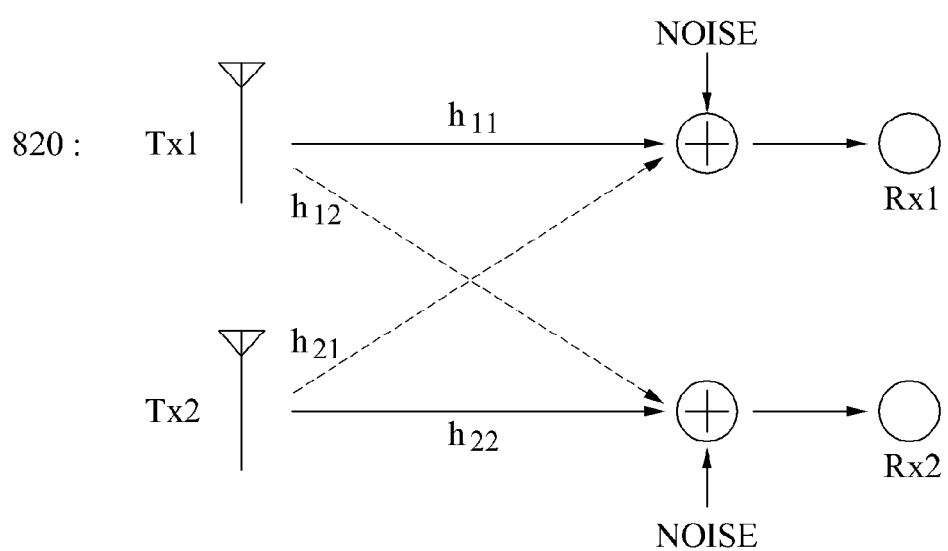

FIG. 11
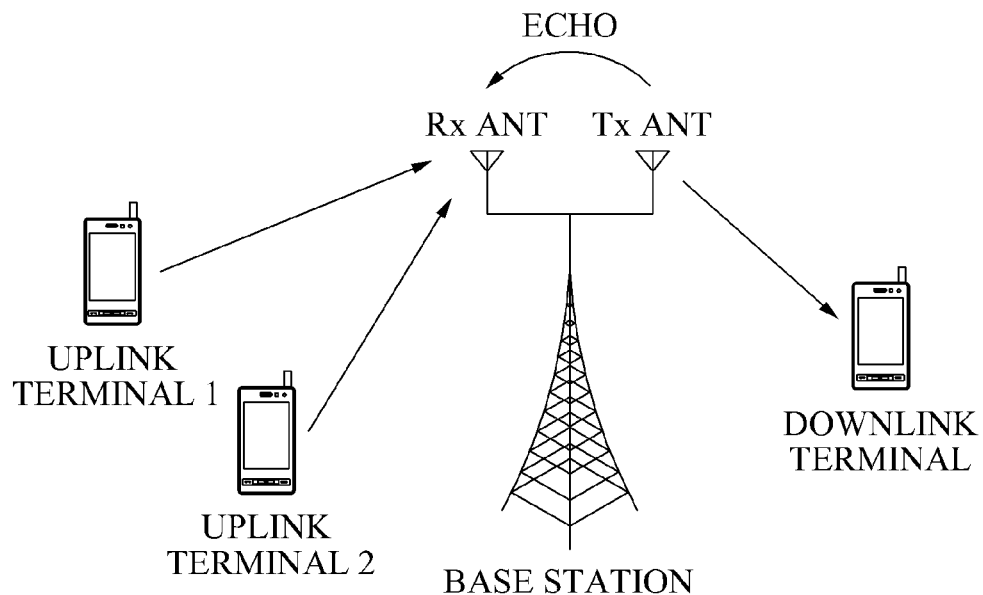
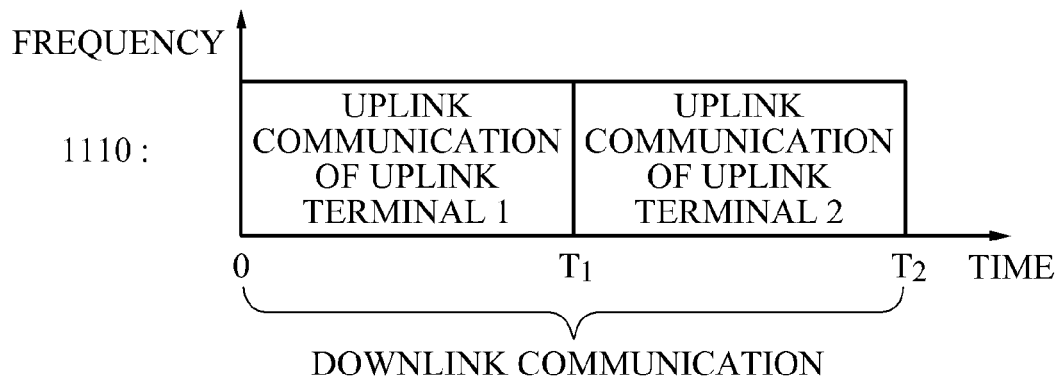

FIG. 12
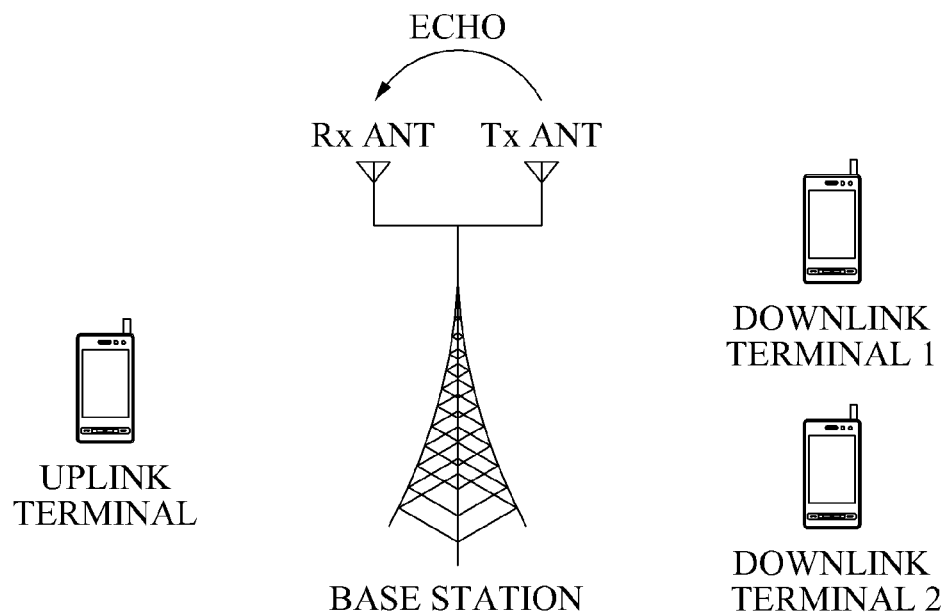
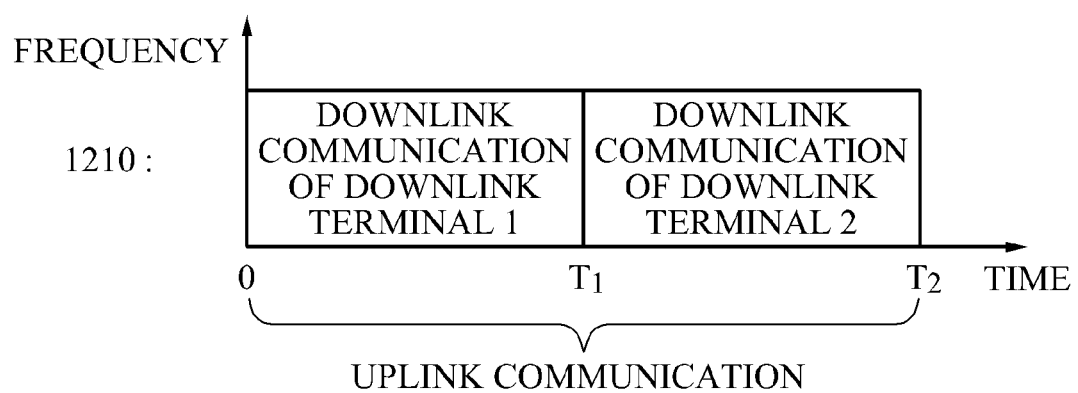

COMMUNICATION SYSTEM OF PERFORMING UPLINK COMMUNICATION AND DOWNLINK COMMUNICATION USING OVERLAPPING RADIO RESOURCE

CROSS-REFERENCE TO RELATED APPLICATIONS

This application claims the benefit under 35 U.S.C. §119(a) of Korean Patent Application No. 10-2010-0011847 filed on Feb. 9, 2010, in the Korean Intellectual Property Office, the entire disclosure of which is incorporated herein by reference for all purposes.

BACKGROUND

1. Field

The following description relates to a communication system for performing an uplink communication and a downlink communication.

2. Description of Related Art

A cellular communication system generally includes at least one base station and at least one terminal. The at least one base station and the at least one terminal may transmit and receive data via an uplink and a downlink.

In a general cellular communication system, a radio resource for an uplink communication may be differentiated from a radio resource for a downlink communication. For example, a cellular communication system using a frequency division duplex (FDD) scheme may divide an entire frequency resource and allocate different portions of the divided frequency resource for each of the uplink communication and the downlink communication. A cellular communication system using a time division duplex (TDD) scheme may divide an entire time resource and allocate different portions of the divided time resource for each of the uplink communication and the downlink communication.

Since an FDD scheme and a TDD scheme each allocate a different radio resource for each of the uplink communication and the downlink communication, interference between the uplink communication and the downlink communication may be substantially reduced and/or easily processed. However, dividing radio resources may decrease a usage efficiency of the radio resources, which may reduce performance of the cellular communication system.

SUMMARY

In one general aspect, a communication method of a base station includes selecting at least one uplink terminal to perform an uplink communication and at least one downlink terminal to perform a downlink communication, allocating a radio resource for the at least one uplink terminal and a radio resource for the at least one downlink terminal, and performing the uplink communication with the at least one uplink terminal and the downlink communication with the at least one downlink terminal using the respective allocated radio resources, wherein the radio resource for the at least one uplink terminal at least partially overlaps the radio resource for the at least one downlink terminal in both time and frequency.

The selecting may include selecting the at least one uplink terminal and the at least one downlink terminal based on interference between a plurality of terminals including the at least one uplink terminal and the at least one downlink terminal.

The selecting may include selecting the at least one uplink terminal and the at least one downlink terminal based on a balance between a volume of uplink communication traffic and a volume of downlink communication, and/or an achievable capacity of each of the uplink communication and the downlink communication.

The selecting may include selecting the at least one uplink terminal and the at least one downlink terminal based on information regarding a channel formed between each of the terminals and the base station, or a characteristic of traffic corresponding to each of the terminals, or a location of each of the terminals, or a mobility of each of the terminals, or interference occurring in at least one receive antenna installed in the base station due to at least one transmit antenna installed in the base station, or information regarding interference channels formed between the terminals, or any combination thereof.

A number of terminals selected as the at least one uplink terminal may be different from a number of terminals selected as the at least one downlink terminal.

The communication method of the base station may further include determining a transmission power or a modulation and coding scheme (MCS) level of the at least one uplink terminal.

The determining may include determining the transmission power or the MCS level of the at least one uplink terminal based on interference between the at least one uplink terminal and the at least one downlink terminal.

The communication method of the base station may further include determining whether the at least one uplink terminal is to use a rate split scheme. The determining of the transmission power or the MCS level may include determining the MCS level of each of a plurality of messages divided by the at least one uplink terminal if the at least one uplink terminal is to use a rate split scheme.

The determining whether the at least one uplink terminal is to use a rate split scheme may include adaptively determining whether the at least one uplink terminal is to use a rate split scheme based on interference between the at least one uplink terminal and the at least one downlink terminal.

The communication method of the base station may further include transmitting control information to the at least one uplink terminal and the at least one downlink terminal, wherein the control information includes information regarding the respective allocated radio resources.

The control information further may include information regarding whether the at least one uplink terminal is to use a rate split scheme, and information regarding a modulation and coding scheme (MCS) level of each of a plurality of messages divided by the at least one uplink terminal if the at least one uplink terminal is to use a rate split scheme.

The control information may further include information regarding a transmission power or a modulation and coding scheme (MCS) level of the at least one uplink terminal.

The performing may include performing the uplink communication with the at least one uplink terminal using at least one receive antenna installed in the base station, and performing the downlink communication with the at least one downlink terminal using at least one transmit antenna that is different from the at least one receive antenna installed in the base station.

The communication method of the base station may further include performing echo cancellation to substantially cancel interference occurring in the at least one receive antenna due to the at least one transmit antenna.

In another general aspect, a communication method of a downlink terminal to perform a downlink communication with a base station includes receiving a reference signal from at least one uplink terminal, measuring an interference channel formed between the at least one uplink terminal and the downlink terminal based on the reference signal, transmitting, to the base station, information regarding the measured interference channel so that the base station selects, from a plurality of terminals, at least one uplink terminal to perform an uplink communication and the downlink terminal to perform the downlink communication, receiving, from the base station, control information including information regarding a radio resource for the downlink terminal, and performing the downlink communication with the base station using the radio resource for the downlink terminal, wherein a radio resource for the at least one uplink terminal at least partially overlaps the radio resource for the downlink terminal in both time and frequency.

The performing may include processing interference occurring in the at least one uplink terminal according to a particular interference control scheme.

The particular interference control scheme may correspond to an interference treated as noise (ITN) scheme of treating the interference as noise, or a complete interference cancellation scheme of removing messages received from the at least one uplink terminal prior to decoding of a desired signal, or a partial interference cancellation scheme of partially removing messages received from the at least one uplink terminal prior to decoding of the desired signal, or any combination thereof.

The control information may further include information regarding whether the at least one uplink terminal is to use a rate split scheme, and information regarding a modulation and coding scheme (MCS) level of each of a plurality of messages divided by the at least one uplink terminal if the at least one uplink terminal is to use a rate split scheme The control information may further include information regarding a transmission power or a modulation and coding scheme (MCS) level of the at least one uplink terminal.

The communication method of the downlink communication may further include transmitting, to the base station, information regarding a channel formed between the base station and the downlink terminal.

In still another general aspect, a communication method of an uplink terminal to perform an uplink communication with a base station includes transmitting a reference signal to a downlink terminal so that the downlink terminal measures an interference channel formed between the uplink terminal and the downlink terminal, receiving, from the base station, control information regarding a radio resource for the uplink terminal if the base station selects, from a plurality of terminals based on the measured interference channel, the uplink terminal and the downlink terminal, and performing the uplink communication with the base station using a radio resource for the uplink terminal, wherein the radio resource for the uplink terminal at least partially overlaps a radio resource for the downlink terminal in both time and frequency.

The performing may include performing the uplink communication by selectively using a rate split scheme depending on the interference channel.

The control information may further include information regarding whether the uplink terminal is to use a rate split scheme, and information regarding a modulation and coding scheme (MCS) level of each of a plurality of messages divided by the uplink terminal if the uplink terminal is to use a rate split scheme.

In another general aspect, a non-transitory computer-readable medium includes a program for instructing a computer to perform a communication method of a base station, the communication method including selecting at least one uplink terminal to perform an uplink communication and at least one downlink terminal to perform a downlink communication, allocating a radio resource for the at least one uplink terminal and a radio resource for the at least one downlink terminal, and performing the uplink communication with the at least uplink terminal and the downlink communication with the at least downlink terminal using the respective allocated radio resources, wherein the radio resource for the at least one uplink terminal at least partially overlaps the radio resource for the at least one downlink terminal in both time and frequency.

In yet another general aspect, a base station includes a selector to select at least one uplink terminal to perform an uplink communication and at least one downlink terminal to perform a downlink communication, an allocator to allocate a radio resource for the at least one uplink terminal and a radio resource for the at least one downlink terminal, and a processor to perform the uplink communication with the at least one uplink terminal and the downlink communication with the at least one downlink terminal using the respective allocated radio resources, wherein the radio resource for the at least one uplink terminal at least partially overlaps the radio resource for the at least one downlink terminal in both time and frequency.

The selector may select the at least one uplink terminal and the at least one downlink terminal based on interference between a plurality of terminals comprising the at least one uplink terminal and the at least one downlink terminal, or a balance between a volume of uplink communication traffic and a volume of downlink communication traffic, or an achievable capacity of each of the uplink communication and the downlink communication, or any combination thereof.

The selector may select the at least one uplink terminal and the at least one downlink terminal based on information regarding a channel formed between each of the terminals and the base station, or a characteristic of traffic corresponding to each of the terminals, or a location of each of the terminals, or a mobility of each of the terminals, or interference occurring in at least one receive antenna installed in the base station due to at least one transmit antenna installed in the base station, or information regarding interference channels formed between the terminals, or any combination thereof.

The base station may further include a decision unit to determine a transmission power or a modulation and coding scheme (MCS) level of the at least one uplink terminal.

The base station may further include a generator to generate control information including information regarding the respective allocated radio resources.

The base station may further include an echo cancellation unit to perform an echo cancellation to substantially cancel interference occurring in at least one receive antenna installed in the base station due to at least one transmit antenna installed in the base station.

In a another general aspect, a downlink terminal to perform a downlink communication with a base station includes a receiver to receive a reference signal from at least one uplink terminal, a measurement unit to measure an interference channel formed between the at least one uplink terminal and the downlink terminal based on the reference signal, a transmitter to transmit, to the base station, information regarding the measured interference channel so that the base station selects, from a plurality of terminals, at least one uplink terminal to perform an uplink communication and the downlink terminal to perform the downlink communication, and a processor to recognize a radio resource for the downlink terminal based on control information including information regarding the radio resource received from the base station, and to with the base station using the radio resource for the downlink terminal, wherein a radio resource for the at least one uplink terminal at least partially overlaps the radio resource for the downlink terminal in both time and frequency.

In still another general aspect, an uplink terminal to perform an uplink communication with a base station includes a transmitter to transmit a reference signal to a downlink terminal so that the downlink terminal measures an interference channel formed between the uplink terminal and the downlink terminal, a receiver to receive, from the base station, control information regarding a radio resource for the uplink terminal if the base station selects, from a plurality of terminals based on the measured interference channel, the uplink terminal and the downlink terminal, and a processor to perform the uplink communication with the base station using the radio resource for the uplink terminal, wherein the radio resource for the uplink terminal at least partially overlaps a radio resource for the downlink terminal in both time and frequency.

According to examples herein, a communication system may allocate a radio resource for uplink communication that at least partially overlaps with a radio resource for downlink communication, and may accordingly improve usage efficiency of radio resources.

According to examples herein, an uplink terminal may adaptively use a rate split scheme according to an interference channel formed between a downlink terminal and the uplink terminal, and may substantially cancel interference occurring in the downlink terminal.

According to examples herein, a downlink terminal may process interference occurring due to an uplink terminal by applying various interference control schemes, for example, an ITN scheme, a complete interference cancellation scheme, a partial interference cancellation scheme, and the like.

According to examples herein, a base station may perform an echo cancellation. Therefore, even though a radio resource for uplink communication may at least partially overlap a radio resource for downlink communication in both time and frequency, data transmitted from an uplink terminal may be effectively received by a downlink terminal.

Other features and aspects will be apparent from the following detailed description, the drawings, and the claims.

BRIEF DESCRIPTION OF THE DRAWINGS

FIG. 2 is a diagram illustrating examples of transmission frames corresponding to a frequency division duplex (FDD) scheme, a time division duplex (TDD) scheme, and a non-division duplex (NDD) scheme, including an uplink communication and a downlink communication for each scheme.

FIG. 4 is a diagram illustrating examples of interference control schemes that may be implemented at a downlink terminal depending on interference between an uplink terminal and a downlink terminal.

FIG. 8 is a diagram illustrating an example of a channel model for the cellular communication system illustrated in FIG. 3.

FIG. 11 is a diagram illustrating an example of a cellular communication system that includes a single downlink terminal and a plurality of uplink terminals, and examples of transmission frames transmitted in the cellular communication system.

FIG. 12 is a diagram illustrating an example of a cellular communication system that includes a plurality of downlink terminals and a single uplink terminal, and examples of transmission frames transmitted in the cellular communication system.

Figure 1:
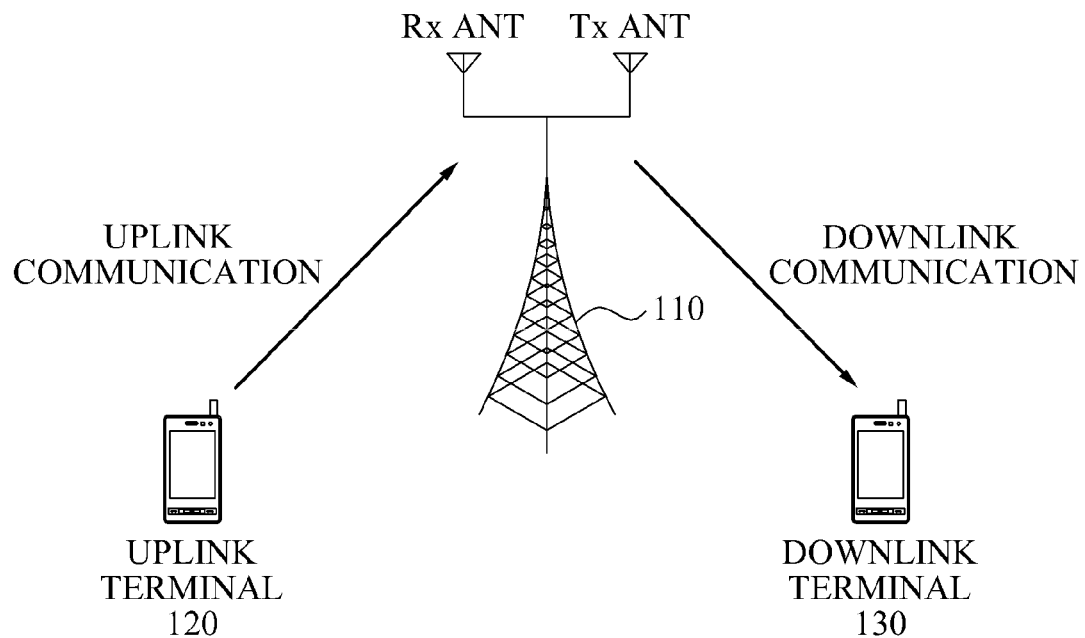
FIG. 1 is a diagram illustrating a general example of a cellular communication system for uplink communication and downlink communication.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. Also, description of well-known functions and constructions may be omitted for increased clarity and conciseness.

FIG. 1 illustrates a general example of a cellular communication system for uplink communication and downlink communication.

Referring to FIG. 1, the cellular communication system includes an uplink terminal 120 performing an uplink communication with a base station 110 and a downlink terminal 130 performing a downlink communication with the base station 110. The base station 110 includes at least one receive antenna Rx ANT for receiving data transmitted from the uplink terminal 120 and at least one transmit antenna Tx ANT for transmitting data to the downlink terminal 130.

A general cellular communication system may apply a frequency division duplex (FDD) scheme or a time division duplex (TDD) scheme for the uplink communication and the downlink communication. These schemes are further described with reference to FIGS. 1 and 2.

FIG. 2 illustrates examples of transmission frames corresponding to an FDD scheme, a TDD scheme, and a non-division duplex (NDD) scheme, including an uplink communication and a downlink communication for each scheme.

Referring to FIG. 2, a transmission frame 210 provides a radio resource for each of the downlink communication and the uplink communication in a cellular communication system that applies an FDD scheme. As illustrated by transmission frame 210, a different frequency resource is allocated to each of the downlink communication and the uplink communication. For example, when the cellular communication system applies an FDD scheme, a different frequency resource may be used for each of the uplink communication and the downlink communication. Therefore, referring to FIG. 1, interference from the uplink terminal 120 to the downlink terminal 130 is reduced due to the use of different frequency resources. The downlink terminal 130 may substantially cancel any interference that remains in an FDD scheme, and interference from the transmit antenna of the base station 110 to the receive antenna of the base station 110 may similarly be substantially cancelled.

A transmission frame 220 provides a radio resource for each of the downlink communication and the uplink communication in a cellular communication system that applies a TDD scheme. As illustrated by transmission frame 220, a different time resource is allocated to each of the downlink communication and the uplink communication. Accordingly, referring to FIG. 1, each of the uplink terminal 120 and the downlink terminal 130 may perform the uplink communication and the downlink communication in a different time interval. Interference from the uplink terminal 120 to the downlink terminal 130 and interference from the transmit antenna of the base station 110 to the receive antenna of the base station 110 is reduced due to the use of different time resources.

A transmission frame 230 provides a radio resource for the downlink communication and the uplink communication in a cellular communication system uses an NDD scheme. An NDD scheme provides a scheme of allocating a radio resource for the downlink communication that overlaps with an allocated radio resource for the uplink communication. For example, according to an NDD scheme, the radio resource for the downlink communication and the radio resource for the uplink resource may completely overlap each other in both time and frequency, or may completely overlap each other in time and partially overlap each other in frequency, or may completely overlap each other in frequency and partially overlap each other in time. Referring to FIG. 1, when the cellular communication system uses an NDD scheme, the uplink terminal 120 and the downlink terminal 130 may respectively perform the uplink communication and the downlink communication using a partially or completely overlapping time resource, and/or a partially or completely overlapping frequency resource, and/or a partially or completely overlapping code resource. An NDD scheme may be combined with various known types of cellular communication technologies such as a scheduling scheme, multi-antenna technology, fractional frequency reuse (FFR), dynamic spectrum management, coordinated communication technology, handover technology, and the like.

When the uplink terminal 120 and the downlink terminal 130 use an overlapping radio resource, interference from the uplink terminal 120 to the downlink terminal 130 may occur and interference from the transmit antenna of the base station 110 to the receive antenna of the base station 110 may also occur. The above interferences may be effectively reduced by implementing an echo cancellation scheme, an interference control scheme, a rate split scheme, and the like.

Figure 3:
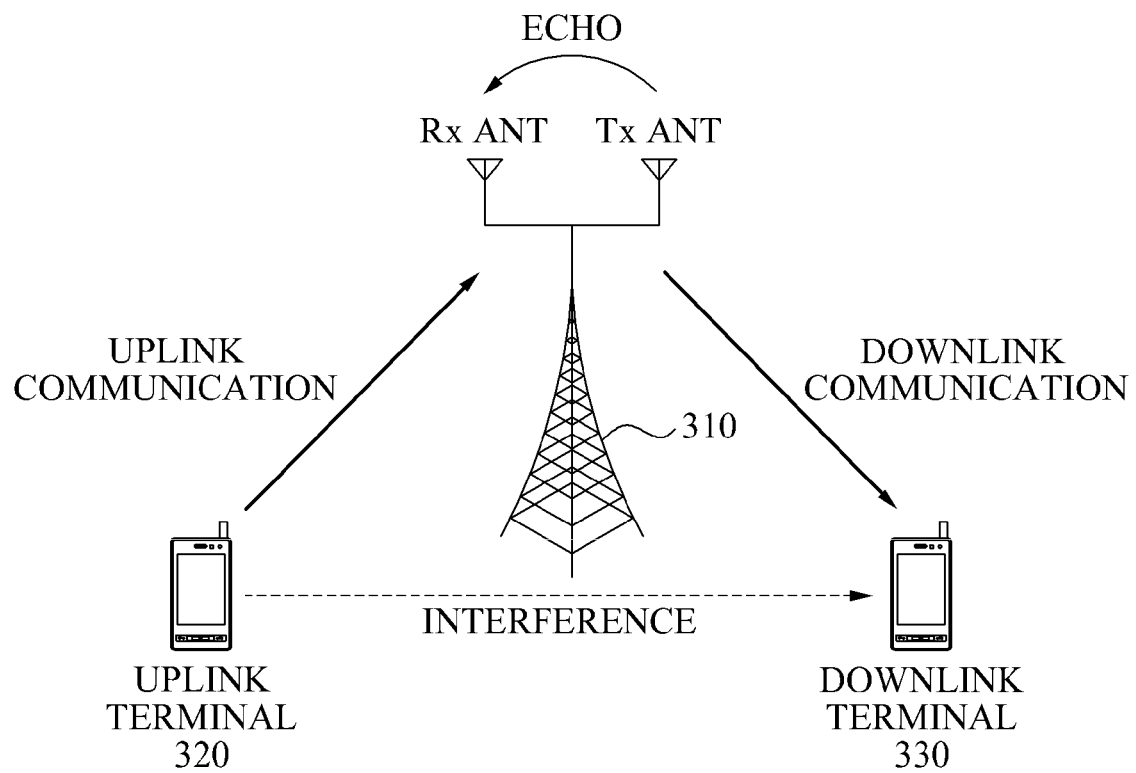
FIG. 3 is a diagram illustrating an example of a cellular communication system according to an NDD scheme.

FIG. 3 illustrates an example of a cellular communication system according to an NDD scheme.

Referring to FIG. 3, when the cellular communication system uses an NDD scheme, each of an uplink terminal 320 and a downlink terminal 330 may respectively perform an uplink communication and a downlink communication with an overlapping radio resource.

A receive antenna Rx ANT of a base station 310 may receive a signal transmitted from the uplink terminal 320 and may also receive a signal, for example, an echo that is transmitted from a transmit antenna Tx ANT of the base station 310 and then is reflected through multiple paths. The base station 310 may recognize the signal transmitted from the transmit antenna and thus may cancel the corresponding echo in the signal received at the receive antenna.

Since each of the uplink terminal 320 and the downlink terminal 330 communicates with the overlapping radio resource, interference from the uplink terminal 320 may occur in the downlink terminal 330. In this example, the downlink terminal 330 may cancel or process the interference by selectively applying one of various interference control schemes, for example, an interference treated as noise (ITN) scheme, a complete interference cancellation scheme, and a partial interference cancellation scheme. Further, the uplink terminal 320 may selectively use a rate split scheme.

In particular, the uplink terminal 320 may selectively use a rate split scheme depending on interference intensity or a state of an interference channel. The downlink terminal 330 may selectively apply one of various interference control schemes depending on the interference intensity. Further, the base station 310 may determine whether the uplink terminal 320 uses a rate split scheme, or whether the downlink terminal 330 uses an interference control scheme.

FIG. 4 illustrates interference control schemes that may be implemented at a downlink terminal, depending on interference between an uplink terminal and the downlink terminal.

Referring to FIG. 4, the downlink terminal may selectively apply one of a variety of interference control schemes depending on an intensity of the interference between the uplink terminal and the downlink terminal.

If the intensity of the interference between the uplink terminal and the downlink terminal is weak, the downlink terminal may process interference occurring in the downlink terminal due to the uplink terminal according to an ITN scheme. According to an ITN scheme, the downlink terminal may treat the interference as noise in decoding a received signal.

If the intensity of the interference between the uplink terminal and the downlink terminal is strong, the downlink terminal may process the interference according to a complete interference cancellation scheme. According to a complete interference cancellation scheme, the uplink terminal may determine a transmission rate for the entire message transmitted by the uplink terminal so that the downlink terminal may decode the entire message transmitted by the uplink terminal. Information regarding the transmission rate for the entire message transmitted by the uplink terminal may be provided to the downlink terminal. The downlink terminal may recognize the transmission rate and decode the entire message received from the uplink terminal based on the transmission rate. After decoding, the downlink terminal may extract a desired signal by removing the decoded entire message of the uplink terminal from the received signal.

If the intensity of the interference between the uplink terminal and the downlink terminal is intermediate, the downlink terminal may process the interference according to a partial interference cancellation scheme. According to a partial interference cancellation scheme, the uplink terminal may divide the entire message into a common message and a private message. A transmission rate of the common message may be set to be decodable by both a base station and the downlink terminal. However, a transmission rate of the private message may be set to be decodable by only the base station. That is, the base station may decode both the common message and the private message, while the downlink terminal may decode only the private message. The uplink terminal may transmit a superposition coded message by applying a superposition coding scheme to the common message and the private message. The downlink terminal may decode only the common message in the superposition coded message. The downlink terminal may then remove the decoded common message from the received signal; thus, the private message may act as interference in the downlink terminal. Since the common message may be removed from the common message and the private message, the downlink terminal may extract a desired signal while realizing a reduction in interference.

As described above, a partial interference cancellation scheme denotes a scheme of cancelling the decoded common message as a portion of interference in the received signal after a transmitter (for example, the uplink terminal) divides the entire message into the common message and the private message and a receiver (for example, the downlink terminal) decodes the common message.

Figure 5:
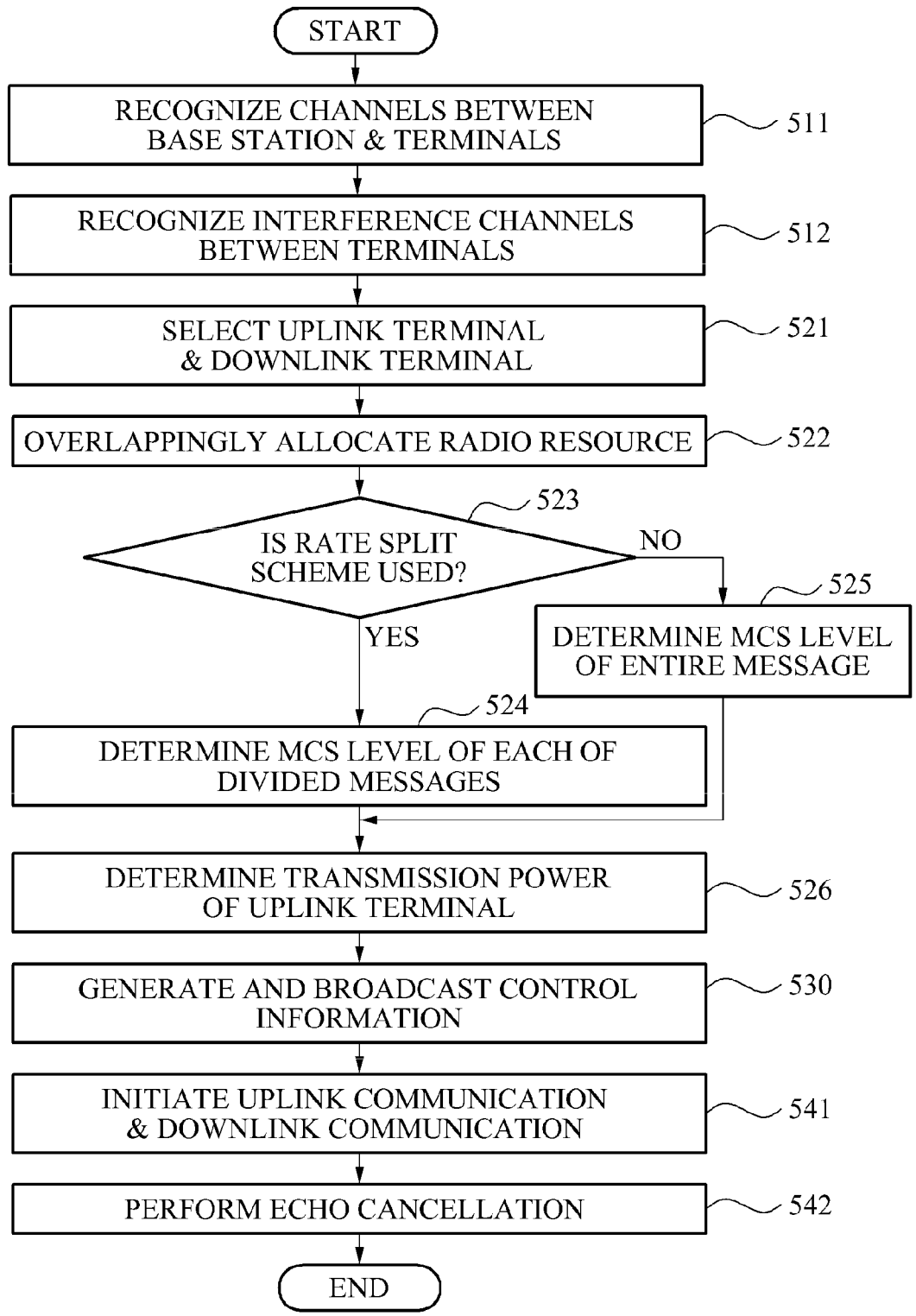
FIG. 5 is a flowchart illustrating an example of communication operations in a base station.

FIG. 5 illustrates an example of communication operations in a base station.

In operation 511, the base station recognizes channels formed between the base station and a plurality of terminals. This operation includes processes such as recognizing a signal to noise ratio (SNR) of each channel, a strength of each channel, a mobility and a location of each terminal, and the like.

The channels formed between the base station and the plurality of terminals may include uplink channels from some or all of the plurality of terminals to the base station. The channels formed may also include downlink channels from the base station to some or all of the plurality of terminals. Information regarding the uplink channels or the downlink channels may be measured by the base station, or may be reported to the base station by some or all of the plurality of terminals. The base station may estimate the downlink channels based on the uplink channels, or may estimate the uplink channels based on the downlink channels.

In operation 512, the base station recognizes interference channels formed between the plurality of terminals. Both an uplink terminal and a downlink terminal may communicate with the base station; thus, a signal transmitted and received between the terminals may be regarded as interference. Accordingly, channels formed between the terminals may be expressed as "interference channels". Each of the terminals may estimate an interference channel based on a unique reference signal, and may report information regarding the estimated interference channel to the base station.

In operation 521, the base station selects at least one uplink terminal and at least one downlink terminal operating according to an NDD scheme. That is, the base station provides an overlapping radio resource based on the channels formed between the base station and the plurality of terminals, and also based on the interference channels formed between the plurality of terminals.

The at least one uplink terminal and the at least one downlink terminal may be selected according to various criteria. Examples of such criteria are described below.

First, the base station may predict an achievable capacity of the uplink communication and the downlink communication based on the channels and the interference channels. The base station may then select the at least one uplink terminal and the at least one downlink terminal to substantially maximize the achievable capacity.

Second, the base station may select the at least one uplink terminal and the at least one downlink terminal based on a balance between traffic or capacity of the uplink communication, and traffic or capacity of the downlink communication.

Third, the base station may select the at least one uplink terminal and the at least one downlink terminal based on a state of each of the interference channels formed between the plurality of terminals and a location of each of the terminals. For example, the base station may select the at least one uplink terminal and the at least one downlink terminal according to a criterion of substantially minimizing interference between the at least one uplink terminal and the at least one downlink terminal, and a criterion of substantially maximizing a distance between the at least one uplink terminal and the at least one downlink terminal.

Fourth, the base station may determine a mobility of each of the terminals. For example, the base station may select, as the at least one uplink terminal and the at least one downlink terminal, terminals having the least mobility. The base station may also select, as the at least one uplink terminal and the at least one downlink terminal, terminals having a mobility below a predetermined threshold.

Fifth, the base station may determine a characteristic of traffic corresponding to each of the terminals. For example, the base station may select, as the at least one uplink terminal and the at least one downlink terminal, terminals corresponding to a similar type or volume of traffic.

Sixth, the base station may use interference, that is, an echo occurring in at least one receive antenna due to one or more transmit antennas installed in the base station. A smaller echo is generally preferable. Therefore, the base station may select the at least one uplink terminal and the at least one downlink terminal so as to decrease the echo.

In addition, the base station may determine, as an individual criterion, each of states of uplink channels and states of downlink channels.

Finally, the base station may establish a predetermined criterion by selectively combining the aforementioned factors.

The base station may select a plurality of downlink terminals corresponding to a single uplink terminal, and may also select a plurality of uplink terminals corresponding to a single downlink terminal. The number of uplink terminals selected may be different from the number of downlink terminals selected. For example, when traffic of a single downlink terminal is significantly greater than traffic of a single uplink terminal, the base station may select at least two uplink terminals. If the base station applies a successive interference cancellation (SIC) scheme, the base station may identify data corresponding to each of at least two uplink terminals even though the at least two uplink terminals are selected.

In operation 522, the base station allocates a radio resource for the selected at least one uplink terminal that overlaps with a radio resource for the selected at least one downlink terminal. The radio resource may include a code resource, a frequency resource, a time resource, and the like. The selected at least one uplink terminal and the selected at least one downlink terminal may respectively perform uplink communication and downlink communication with at least partially the same radio resource.

In operation 523, the base station determines whether at least one uplink terminal is to use a rate split scheme. In particular, the base station may adaptively determine whether the at least one uplink terminal is to use a rate split scheme based on the interference between the at least one uplink terminal and the at least one downlink terminal.

For example, if an intensity of the interference from an uplink terminal to a downlink terminal is weak, the downlink terminal may process the interference according to an ITN scheme, without using a rate split scheme. If the intensity of the interference from the uplink terminal to the downlink terminal is strong, the downlink terminal may process the interference according to a complete interference cancellation scheme even though the uplink terminal transmits the entire message at a single transmission rate without using a rate split scheme. However, if the intensity of interference from the uplink terminal to the downlink terminal is intermediate, the uplink terminal may use a rate split scheme by dividing the entire message into a common message and a private message. The downlink terminal may substantially cancel the interference according to the partial interference cancellation scheme.

If the uplink terminal is determined to use a rate split scheme, in operation 524 the base station determines a modulation and a coding scheme (MCS) level of each of a plurality of messages divided from the message of the uplink terminal based on the interference between the uplink terminal and the downlink terminal. Here, the divided messages include the common message and the private message. Determining an MCS level of a message includes determining a transmission rate of the message, a modulation scheme of the message, a coding scheme of the message, and the like.

However, if the uplink terminal is determined not to use a rate split scheme, the base station determines an MCS level of the entire message of the uplink terminal in operation 525.

In operation 526, the base station determines a transmission power of the uplink terminal. The base station may determine the transmission power of the uplink terminal based on a channel formed between the base station and the uplink terminal, and also based on an interference channel formed between the uplink terminal and the downlink terminal.

In operation 530, the base station generates and broadcasts control information. The control information may include information regarding the radio resource for the at least one uplink terminal and the radio resource for the at least one downlink terminal. The control information may further include information regarding whether the at least one uplink terminal uses a rate split scheme. The control information may also include information regarding an MCS level of each of a plurality of messages divided by the at least one uplink terminal if the at least one uplink terminal uses a rate split scheme. The control information may further include information regarding a transmission power or an MCS level of the at least one uplink terminal.

Based on the control information, each of the at least one uplink terminal and the at least one downlink terminal may recognize a corresponding radio resource, whether a corresponding uplink terminal uses a rate split scheme, an MCS level of the entire message or divided messages of the uplink terminal, a transmission power of the uplink terminal, and the like.

In operation 541, the base station initiates an uplink communication and a downlink communication with the at least one uplink terminal and the at least one downlink terminal, using an overlapping radio resource.

The uplink communication and the downlink communication are performed substantially simultaneously. Accordingly, interference may occur in at least one receive antenna due to an echo from at least one transmit antenna installed in the base station. In operation 542, the base station performs an echo cancellation to substantially cancel the interference due to the echo. For example, the echo cancellation may include an analog RF echo cancellation and/or a digital baseband echo cancellation. However, echo cancellation schemes are well known in the art, and thus further description related thereto is omitted here.

Figure 6:
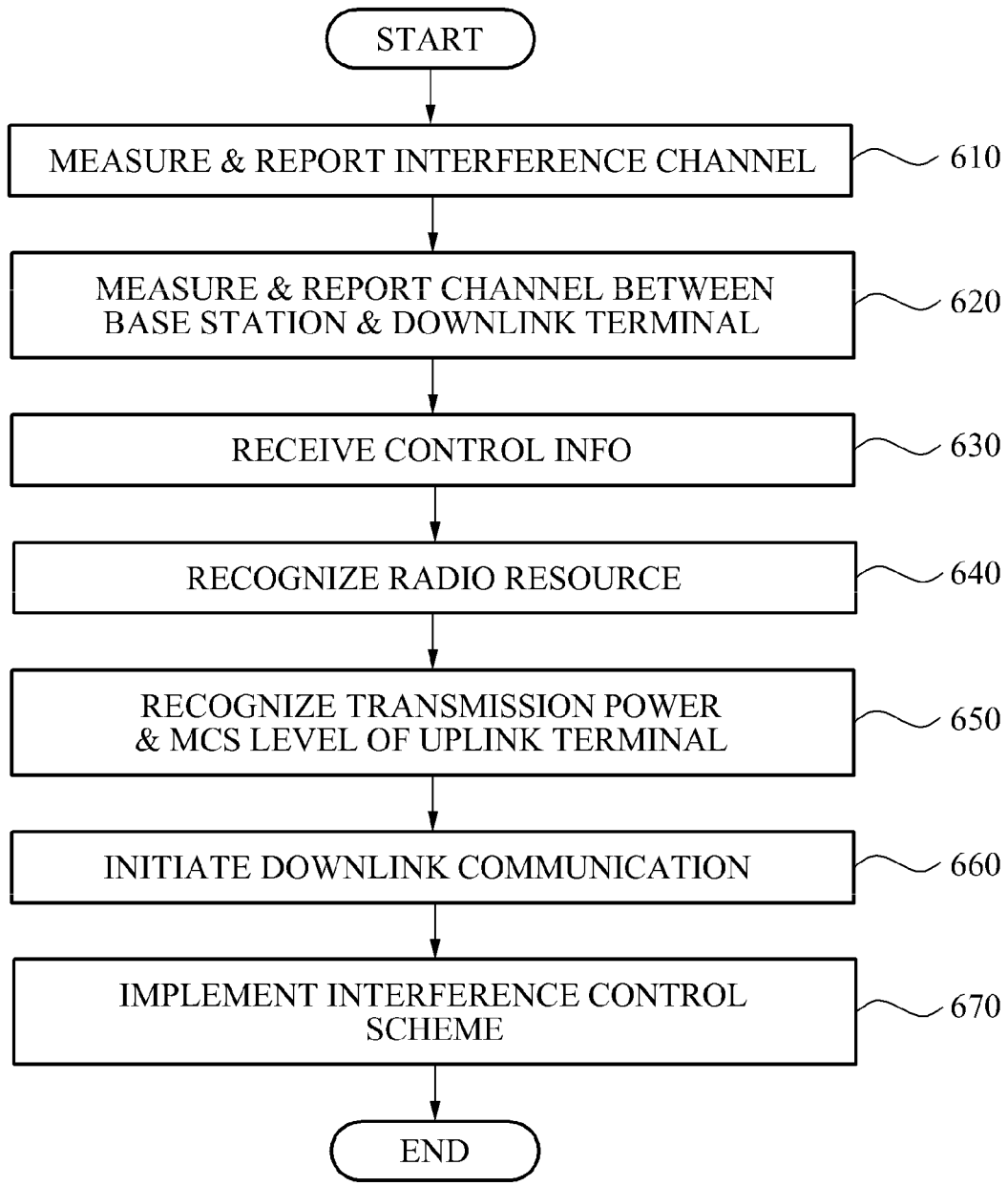
FIG. 6 is a flowchart illustrating an example of communication operations in a downlink terminal.

FIG. 6 illustrates an example of communication operations in a downlink terminal.

In operation 610, the downlink terminal measures at least one interference channel based on a reference signal transmitted from at least one uplink terminal, and reports, to a base station, information regarding the measured at least one interference channel. Hereinafter, an example is provided wherein only a single uplink terminal exists.

In operation 620, the downlink terminal measures a channel formed between the base station and the downlink terminal, that is, a downlink channel based on the reference signal transmitted from the base station The downlink terminal then reports to the base station information regarding the downlink channel. As an example, even though the downlink terminal does not report to the base station information regarding the downlink channel, the base station may measure an uplink channel and then estimate the downlink channel from the uplink channel.

Terminals that are selected as the uplink terminal and the downlink terminal, as well as a plurality of terminals adjacent to the selected terminals, may estimate and report information regarding the channel or the interference channel. The base station may select the uplink terminal and the downlink terminal based on information regarding the channel or the interference channel reported from each of the terminals.

In operation 630, the downlink terminal receives control information broadcasted by the base station. In operation 640, the downlink terminal recognizes a radio resource for the downlink communication based on the control information. In operation 650, the downlink terminal recognizes a transmission power of the uplink terminal and an MCS level of the entire message or of each of the divided messages of the uplink terminal. Although not shown in operation 650, the downlink terminal also recognizes whether the uplink terminal uses a rate split scheme.

In operation 660, the downlink terminal initiates downlink communication using the recognized radio resource. The uplink terminal also uses a radio resource that at least partially overlaps with the radio resource used by the downlink communication. Accordingly, due to the uplink terminal, interference may occur in the downlink terminal. In operation 670, the downlink terminal processes the interference by implementing one of various interference control schemes.

As described above, the interference control schemes may include an ITN scheme, a complete interference cancellation scheme, and/or a partial interference cancellation scheme. One of the ITN scheme, the complete interference cancellation scheme, and the partial interference cancellation scheme may be adaptively selected based on an interference channel formed between the downlink terminal and the uplink terminal. In particular, when the partial interference cancellation scheme is selected, information regarding a transmission rate or an MCS level of each of a plurality of messages divided from the entire message of the uplink terminal may be provided to the downlink terminal in advance.

Figure 7:
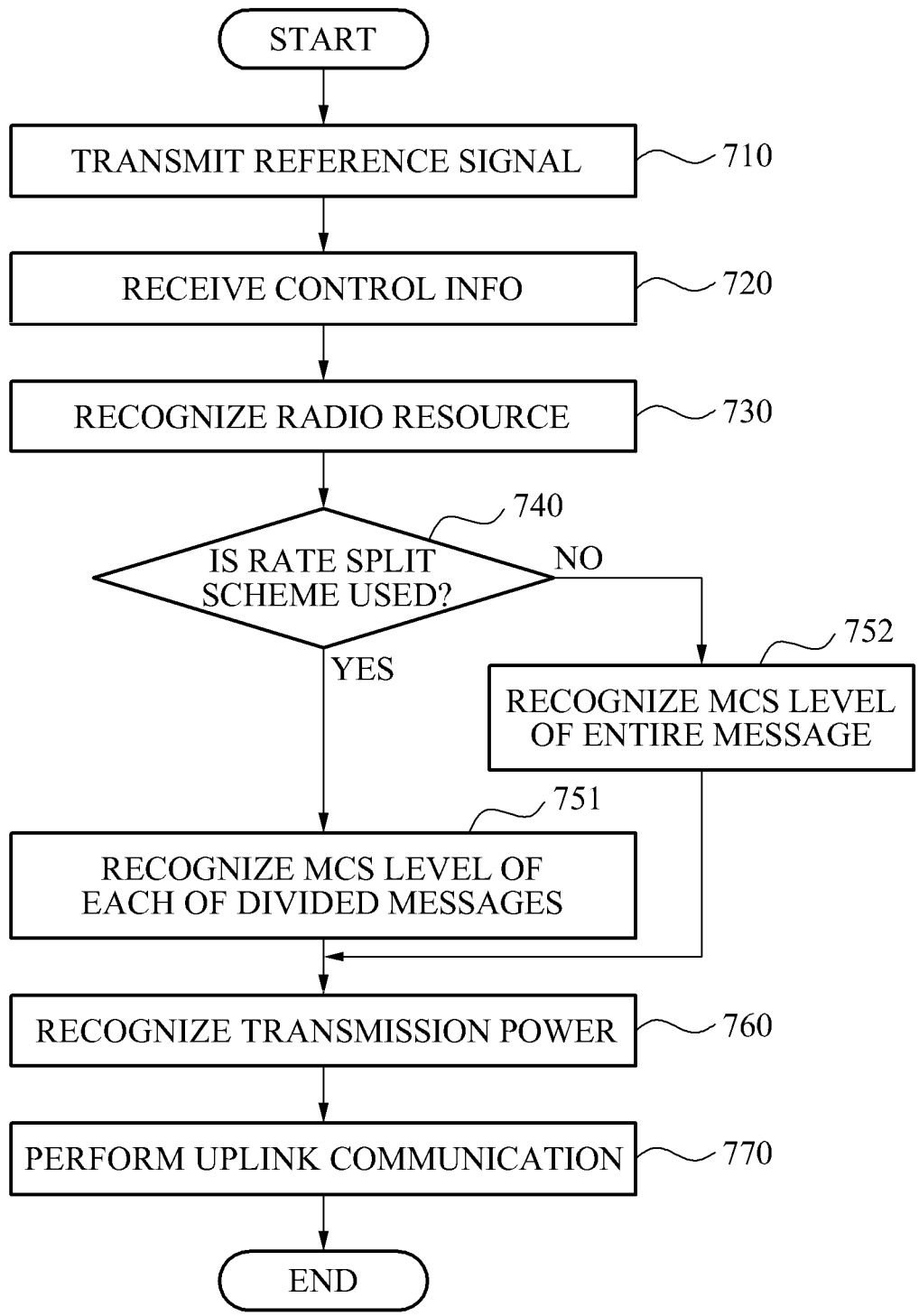
FIG. 7 is a flowchart illustrating an example of communication operations in an uplink terminal.

FIG. 7 illustrates an example of communication operations in an uplink terminal.

In operation 710, the uplink terminal transmits a reference signal to a downlink terminal so that the downlink terminal may measure an interference channel formed between the uplink terminal and the downlink terminal. In addition to the uplink terminal, any terminal that may be selected as the uplink terminal may transmit the reference signal. In addition to the downlink terminal, any terminal that may be selected as the downlink terminal may measure a corresponding interference channel.

As described above, a base station may select the uplink terminal and the downlink terminal based on interference channels formed between a plurality of terminals and channels formed between the plurality of terminals and the base station; that is, the base station may make the selection based on downlink channels and uplink channels. Accordingly, the base station may broadcast control information to the uplink terminal and the downlink terminal.

In operation 720, the uplink terminal receives the control broadcasted by the base station. In operation 730, the uplink terminal recognizes a radio resource for an uplink communication based on the control information. In operation 740, the uplink terminal determines whether to use a rate split scheme, based on the control information.

a rate split scheme is to be used, in operation 751 the uplink terminal divides the entire message into a common message and a private message and recognizes an MCS level of each of the common message and the private message, based on the control information. However, if a rate split scheme is not to be used, in operation 752 the uplink terminal recognizes an MCS of the entire message.

In operation 760, the uplink terminal recognizes a transmission power based on the control information.

In operation 770, the uplink terminal performs the uplink communication using the recognized radio resource. The uplink terminal may use a rate split scheme, and the uplink terminal may apply the recognized MCS level and transmission power.

FIG. 8 illustrates an example of a channel model for the cellular communication system illustrated in FIG. 3.

Referring to channel model 810, a base station communicates via an uplink communication and a downlink communication, using an overlapping radio resource. Accordingly, the base station operates as a transmitter Tx1 for communicating with a downlink terminal Rx1, and operates as a receiver Rx2 for communicating with an uplink terminal Tx2.

As illustrated in channel model 820, the cellular communication system is depicted as a channel model including signal channels $h_{11}$ and $h_{22}$ and interference channels $h_{12}$ and $h_{21}$. The interference channel $h_{12}$ denotes interference (that is, an echo) occurring at a receive antenna due to a transmit antenna of the base station, and the interference channel $h_{21}$ denotes interference from the uplink terminal to the downlink terminal.

In general, the intensity of interference channel $h_{12}$ may be relatively strong. However, the base station may be aware of a signal output from the transmit antenna. The base station operating as the receiver Rx2 may perform an echo cancellation by removing a signal received from the transmit antenna in a received signal.

An intensity of interference channel $h_{21}$ may be classified into weak, intermediate, and strong. A determination as to whether the uplink terminal is to use a rate split scheme, an MCS level determined by the uplink terminal, a transmission power, or an interference control scheme of the downlink terminal may vary depending on the intensity of interference channel $h_{21}$.

Operations of the base station, the uplink terminal, and the downlink terminal based on the channel model of FIG. 8 are described below with reference to FIG. 9.

Figure 9:
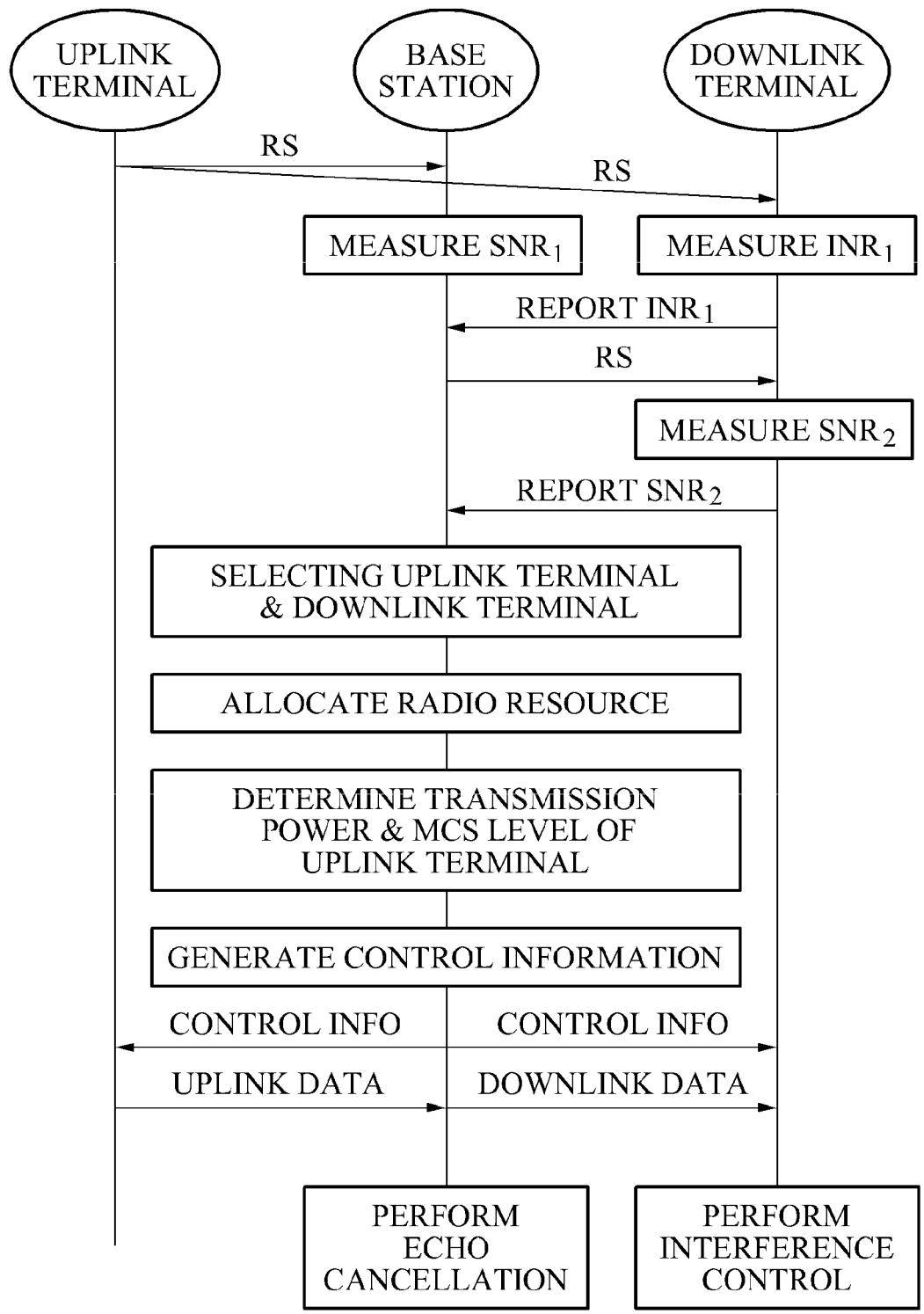
FIG. 9 is a diagram illustrating communication among an uplink terminal, a base station, and a downlink terminal in the channel model illustrated in FIG. 8.

FIG. 9 illustrates communication among an uplink terminal, a base station, and a downlink terminal in the channel model illustrated in FIG. 8.

Referring to FIG. 1, the uplink terminal transmits a reference signal (RS) or a sounding reference signal (SRS) to the base station and the downlink terminal. In this example, in addition to the uplink terminal, each of terminals that may be selected as the uplink terminal may transmit a unique RS to both the base station and terminals that may be selected as the downlink terminal.

The base station measures $SNR_1$, which is the SNR of channel $h_{22}$, based on the RS transmitted from the uplink terminal. The downlink terminal measures $INR_1$, which is the interference to noise ratio (INR) of channel $h_{21}$, based on the RS transmitted from the uplink terminal. The downlink terminal reports to the base station information regarding $INR_1$, and the base station determines a state of channel $h_{21}$ based on the reported information. In this example, the downlink terminal may further report to the base station information regarding $INR_1$ and information regarding a pattern of the RS transmitted from the uplink terminal to facilitate the base station in identifying the uplink terminal.

The base station transmits an RS to the downlink terminal to determine a state of channel $h_{11}$, which is between the base station and the downlink terminal. The downlink terminal measures $SNR_2$, which is the SNR of channel $h_{11}$, and then reports to the base station information regarding $SNR_2$. Depending on the particular implementation, a process of measuring and reporting $SNR_2$ may be omitted. For example, while the downlink terminal reports to the base station information regarding $INR_1$, the base station may estimate a state of channel $h_{11}$. Accordingly, in this example, a process of measuring and reporting $SNR_2$ may be omitted.

Through the above operations, the base station may determine channels formed between each of a plurality of terminals and the base station, and interference channels formed between the plurality of terminals. The base station selects an uplink terminal and a downlink terminal based on $SNR_1$, $SNR_2$, and $INR_1$. The base station may select the uplink terminal and the downlink terminal from the plurality of terminals by considering various factors. In addition to $SNR_1$, $SNR_2$, and $INR_1$, the factors may include a characteristic of traffic corresponding to each of the uplink terminal and the downlink terminal, a location and a mobility of each of the uplink terminal and the downlink terminal, and the like.

If the uplink terminal and the downlink terminal are selected, the base station allocates overlapping radio resources to the uplink terminal and the downlink terminal. The base station determines a transmission power and an MCS level of the uplink terminal based on $INR_1$. Although not illustrated in FIG. 9, the base station may determine whether the uplink terminal is to use a rate split scheme. When the uplink terminal uses a rate split scheme, an MCS level of each of the divided messages may be determined.

The base station generates control information that includes information regarding the radio resource, information regarding the transmission power and the MCS level of the uplink terminal, information regarding whether the uplink terminal is to use a rate split scheme, and the like. The base station then broadcasts the control information.

Each of the downlink terminal and the uplink terminal receives the control information, and performs respective downlink communication and uplink communication. The base station substantially cancels the echo between a receive antenna and a transmit antenna by applying an echo cancellation. For example, the echo cancellation may include an analog RF echo cancellation and/or a digital baseband echo cancellation. The downlink terminal performs an interference control according to one of various interference control schemes.

Figure 10:
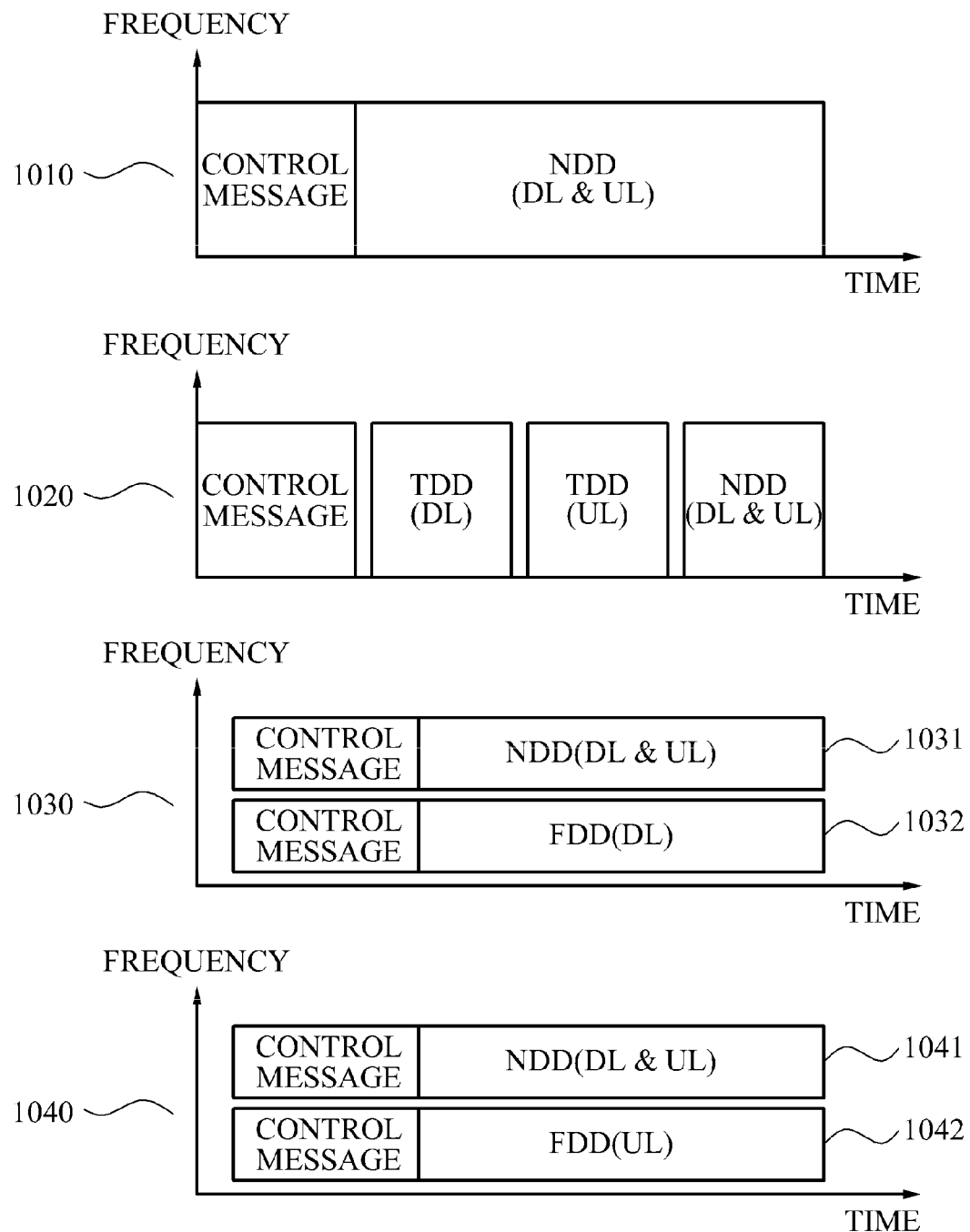
FIG. 10 is a diagram illustrating various examples of transmission frames.

FIG. 10 illustrates various examples of transmission frames.

Transmission frame 1010 indicates a simple format of a radio resource allocated according to an NDD scheme. The transmission frame 1010 includes a radio resource for a control message and the same radio resource for an uplink communication and a downlink communication. Here, the control message may include a synchronous signal, media access protocol (MAP) information, information regarding a structure of the transmission frame 1010, control information, and the like.

Transmission frame 1020 indicates a radio resource allocated in a cellular communication system that uses both an NDD scheme and a TDD scheme. The transmission frame 1020 may include a radio resource for a control message, a radio resource for a downlink communication of a TDD scheme, a radio resource for an uplink communication of a TDD scheme, and a radio resource according to an NDD scheme.

Transmission frame 1030 includes a radio resource 1031 for an NDD scheme and a radio resource 1032 for a downlink communication according to an FDD scheme. The base station may substantially simultaneously perform downlink communication and uplink communication with particular terminals using the radio resource 1031 for an NDD scheme. However, the base station may only perform downlink communication with certain terminals using the radio resource 1032, according to an FDD scheme.

A transmission frame 1040 includes a radio resource 1041 for an NDD scheme and a radio resource 1042 for an uplink communication according to an FDD scheme. The base station may substantially simultaneously perform downlink communication and uplink communication with particular terminals using the radio resource 1041 for an NDD scheme. However, the base station may only perform uplink communication with certain terminals, using the radio resource 1042.

As shown in the transmission frames 1020, 1030, and 1040, a TDD scheme or an FDD scheme may be used together with an NDD scheme. Accordingly, it is possible to maintain a compatibility of terminals not supporting an NDD scheme, and to enhance a performance of the entire communication system.

FIG. 11 illustrates an example of a cellular communication system that includes a single downlink terminal and a plurality of uplink terminals, and examples of transmission frames transmitted in the cellular communication system.

Referring to FIG. 11, the number of downlink terminals may be different from the number of uplink terminals. For example, a single transmission frame may include a radio resource for a single downlink terminal and a radio resource for both uplink terminals 1 and 2.

Referring to the example of transmission frame 1110, the downlink terminal performs downlink communication over time interval $0\text{-}T_2$, the uplink terminal 1 performs uplink communication only in time interval $0\text{-}T_1$, and the uplink terminal 2 performs uplink communication only in time interval $T_1\text{-}T_2$. In particular, the volume of traffic for each uplink terminal is relatively small compared to the volume of traffic for the downlink terminal. The capacity of the uplink communication may be improved by grouping a plurality of uplink terminals and allocating the grouped uplink terminals to the single transmission frame 1110.

Referring to the example of transmission frame 1120, the entire time resource may remain undivided for each of the uplink terminals 1 and 2. In this example, each of the uplink terminals 1 and 2 may use the time interval $0\text{-}T_2$. Further, a transmission power of each uplink terminal may be adjusted for the base station to identify a signal of each uplink terminal.

FIG. 12 illustrates an example of a cellular communication system that includes a plurality of downlink terminals and a single uplink terminal, and examples of transmission frames transmitted in the cellular communication system.

Referring to 12, the number of downlink terminals may be different from the number of uplink terminals. For example, a single transmission frame may include a radio resource for two downlink terminals 1 and 2, and a radio resource for a single uplink terminal.

Referring to the example of transmission frame 1210, the uplink terminal performs uplink communication over time interval $0\text{-}T_2$, the downlink terminal 1 performs downlink communication only in time interval $0\text{-}T_1$, and a downlink terminal 2 performs downlink communication only in time interval $T_1\text{-}T_2$. In particular, the volume of traffic for each downlink terminal is relatively small compared to the volume of traffic for the uplink terminal. The capacity of the downlink communication may be improved by grouping a plurality of downlink terminals and allocating the grouped downlink terminals to the single transmission frame 1210.

Referring to the example of transmission frame 1220, the entire time resource may remain undivided for each of the downlink terminals 1 and 2. In this example, each of the downlink terminals 1 and 2 may use the time interval $0\text{-}T_2$.

The methods described above may be recorded, stored, or fixed in one or more non-transitory computer-readable medium that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

Figure 13:
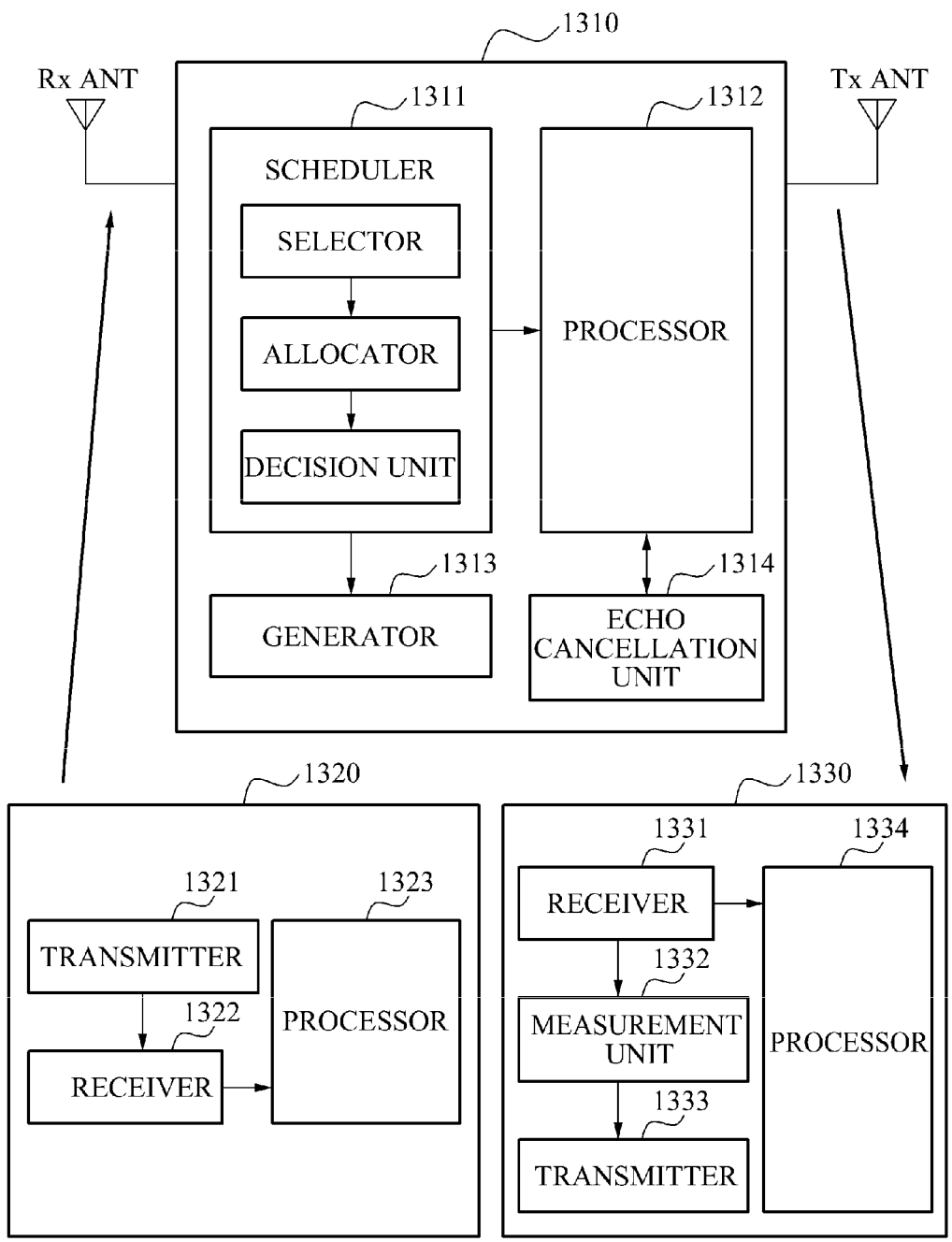
FIG. 13 is a diagram illustrating an example of a base station, an uplink terminal, and a downlink terminal.

FIG. 13 illustrates an example of a base station 1310, an uplink terminal 1320, and a downlink terminal 1330.

Referring to FIG. 13, the base station 1310 includes a scheduler 1311, a processor 1312, a generator 1313, and an echo cancellation unit 1314.

The scheduler 1311 includes a selector, an allocator, and a decision unit.

The selector of the scheduler 1311 may select the uplink terminal 1320 for performing uplink communication and the downlink terminal 1330 for performing downlink communication, using an overlapping radio resource. The selector may select the uplink terminal 1320 and the downlink terminal 1330 based on interference between a plurality of terminals, or a balance between the uplink communication and the downlink communication, or an achievable capacity of each of the uplink communication and the downlink communication, or any combination thereof. The selector may select the uplink terminal 1320 and the downlink terminal 1330 based on information regarding a channel formed between the base station and each of the terminals, or a characteristic of traffic corresponding to each of the terminals, or a location of each of the terminals, or a mobility of each of the terminals, or interference occurring in at least one receive antenna installed in the base station due to at least one transmit antenna installed in the base station, or interference channels formed between the plurality of terminals, or any combination thereof.

The allocator of the scheduler 1311 may allocate a radio resource for the uplink terminal 1320 that overlaps with an allocated radio resource for the downlink terminal 1330.

The decision unit of the scheduler 1311 may determine a transmission power or an MCS level of the uplink terminal 1320. The decision unit may determine whether the uplink terminal 1320 is to use a rate split scheme. The decision unit then may determine an MCS level of the entire message or the divided messages of the uplink terminal 1320.

The processor 1312 may perform uplink communication and downlink communication using the radio resource for the uplink terminal 1320 and the radio resource for the downlink terminal 1330, respectively.

The generator 1313 may generate control information that includes information regarding the radio resource for the uplink terminal 1320 and information regarding the radio resource for the downlink terminal 1330.

The echo cancellation unit 1314 may perform an echo cancellation on a signal received by at least one receive antenna installed in the base station in order to cancel interference occurring in the at least one receive antenna installed in the base station due to the at least one transmit antenna installed in the base station 1310. For example, the echo cancellation unit may include an analog RF echo canceller and/or a digital baseband echo canceller.

The uplink terminal 1320 includes a transmitter 1321, a receiver 1322, and a processor 1323.

The transmitter 1321 may transmit a reference signal to the downlink terminal 1330, so that the downlink terminal 1330 may measure an interference channel formed between the uplink terminal 1320 and the downlink terminal 1330.

When the base station 1310 selects the uplink terminal 1320 and the downlink terminal 1330 from a plurality of terminals based on the measured interference channel, the receiver 1322 may receive, from the base station 1310, control information including information regarding the radio resource for the uplink terminal 1320.

The processor 1323 may perform uplink communication using the radio resource for the uplink terminal 1320. The processor 1323 may selectively use a rate split scheme.

The downlink terminal 1330 includes a receiver 1331, a measurement unit 1332, a transmitter 1333, and a processor 1334.

The receiver 1331 may receive a reference signal from the uplink terminal 1320.

The measurement unit 1332 may measure an interference channel formed between the uplink terminal 1320 and the downlink terminal 1330, based on the reference signal.

The transmitter 1333 may transmit, to the base station 1310, information regarding the measured interference channel. Accordingly, the base station 1310 may select, from a plurality of terminals, the uplink terminal 1320 for performing uplink communication and the downlink terminal 1330 for performing downlink communication, using the overlapping radio resource.

The receiver 1331 may receive, from the base station 1310, control information including information regarding the radio resource for the downlink terminal 1330.

The processor 1334 may perform downlink communication using the radio resource for the downlink terminal 1330. In this example, the processor 1334 may selectively use one of an ITN scheme of treating the interference as noise, a complete interference cancellation scheme of removing messages received from at least one uplink terminal prior to decoding of a desired signal, a partial interference cancellation scheme of partially removing the messages received from at least one uplink terminal prior to decoding of the desired signal, and the like.

Descriptions made above with reference to FIG. 1 to FIG. 12 may be correspondingly applied to the base station 1310, the uplink terminal 1320, and the downlink terminal 1330 of FIG. 13. Accordingly, further descriptions related thereto are omitted here.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a base station, the communication method comprising:
   selecting an uplink terminal to perform an uplink communication and a downlink terminal to perform a downlink communication;
   allocating a radio resource for the uplink terminal and a radio resource for the downlink terminal;
   performing the uplink communication with the uplink terminal and the downlink communication with the downlink terminal using the respective allocated radio resources,
   wherein the radio resource for the uplink terminal at least partially and simultaneously overlaps the radio resource for the downlink terminal in both time and frequency; and
   determining a transmission power or a modulation and coding scheme (MCS) level of the uplink terminal,
   wherein the determining of the transmission power or the MCS level comprises determining an MCS level of each of a plurality of messages divided by the uplink terminal in response to the uplink terminal using a rate split scheme.

2. The communication method of claim 1, wherein the selecting comprises selecting the uplink terminal and the downlink terminal based on interference between a plurality of terminals comprising the uplink terminal and the downlink terminal.

3. The communication method of claim 1, wherein the selecting comprises selecting the uplink terminal and the downlink terminal based on a balance between a volume of uplink communication traffic and a volume of downlink communication, and/or an achievable capacity of each of the uplink communication and the downlink communication.

4. The communication method of claim 1, wherein the selecting comprises selecting the uplink terminal and the downlink terminal based on information regarding a channel formed between each of the terminals and the base station, or a characteristic of traffic corresponding to each of the terminals, or a location of each of the terminals, or a mobility of each of the terminals, or interference occurring in a receive antenna installed in the base station due to a transmit antenna installed in the base station, or information regarding interference channels formed between the terminals, and any combination thereof.

5. The communication method of claim 1, wherein a number of terminals selected as the uplink terminal is different from a number of terminals selected as the downlink terminal.

6. The communication method of claim 1, wherein the determining comprises determining the transmission power or the MCS level of the uplink terminal based on interference between the uplink terminal and the downlink terminal.

7. The communication method of claim 1, further comprising transmitting control information to the uplink terminal and the downlink terminal;
wherein the control information comprises information regarding the respective allocated radio resources.

8. The communication method of claim 7, wherein the control information further comprises information regarding whether the uplink terminal is to use a rate split scheme, and information regarding a modulation and coding scheme (MCS) level of each of a plurality of messages divided by the uplink terminal in response to the uplink terminal using a rate split scheme.

9. The communication method of claim 7, wherein the control information further comprises information regarding a transmission power or a modulation and coding scheme (MCS) level of the uplink terminal.

10. The communication method of claim 1, wherein the performing comprises performing the uplink communication with the uplink terminal using a receive antenna installed in the base station, and performing the downlink communication with the downlink terminal using a transmit antenna installed in the base station that is different from the receive antenna installed in the base station.

11. The communication method of claim 10, further comprising performing echo cancellation to substantially cancel interference occurring in the receive antenna due to the transmit antenna.

12. A communication method of a downlink terminal to perform a downlink communication with a base station, the communication method comprising:
receiving a reference signal from an uplink terminal;
measuring an interference channel formed between the uplink terminal and the downlink terminal based on the reference signal;
transmitting, to the base station, information regarding the measured interference channel so that the base station selects, from a plurality of terminals, an uplink terminal to perform an uplink communication and the downlink terminal to perform the downlink communication;
receiving, from the base station, control information comprising information regarding a radio resource for the downlink terminal; and
performing the downlink communication with the base station using the radio resource for the downlink terminal;
wherein a radio resource for the uplink terminal at least partially and simultaneously overlaps the radio resource for the downlink terminal in both time and frequency, and
wherein the control information further comprises information regarding whether the uplink terminal is to use a rate split scheme, and information regarding a modulation and coding scheme (MCS) level of each of a plurality of messages divided by the uplink terminal in response to the uplink terminal using a rate split scheme.

13. The communication method of claim 12, wherein the performing comprises processing interference occurring in the uplink terminal according to a particular interference control scheme.

14. The communication method of claim 13, wherein the particular interference control scheme corresponds to an interference treated as noise (ITN) scheme of treating the interference as noise, or a complete interference cancellation scheme of removing messages received from the uplink terminal prior to decoding of a desired signal, or a partial interference cancellation scheme of partially removing messages received from the uplink terminal prior to decoding of the desired signal, or any combination thereof.

15. The communication method of claim 12, wherein the control information further comprises information regarding a transmission power or a modulation and coding scheme (MCS) level of the uplink terminal.

16. The communication method of claim 12, further comprising transmitting, to the base station, information regarding a channel formed between the base station and the downlink terminal.

17. A communication method of an uplink terminal to perform an uplink communication with a base station, the communication method comprising:
transmitting a reference signal to a downlink terminal so that the downlink terminal measures an interference channel formed between the uplink terminal and the downlink terminal;
receiving, from the base station, control information regarding a radio resource for the uplink terminal in response to the base station selecting, from a plurality of terminals based on the measured interference channel, the uplink terminal and the downlink terminal; and
performing the uplink communication with the base station using the radio resource for the uplink terminal;
wherein the radio resource for the uplink terminal at least partially and simultaneously overlaps a radio resource for the downlink terminal in both time and frequency, and
wherein the control information further comprises information regarding whether the uplink terminal is to use a rate split scheme, and information regarding a modulation and coding scheme (MCS) level of each of a plurality of messages divided by the uplink terminal in response to the uplink terminal using a rate split scheme.

18. The communication method of claim 17, wherein the performing comprises performing the uplink communication by selectively using a rate split scheme depending on the interference channel.

19. A non-transitory computer-readable medium comprising a program for instructing a computer to perform a communication method of a base station, the communication method comprising:
selecting an uplink terminal to perform an uplink communication and a downlink terminal to perform a downlink communication;
allocating a radio resource for the uplink terminal and a radio resource for the downlink terminal; and
performing the uplink communication with the uplink terminal and the downlink communication with the downlink terminal using the respective allocated radio resources;
wherein the radio resource for the uplink terminal at least partially and simultaneously overlaps the radio resource for the downlink terminal in both time and frequency; and
determining a transmission power or a modulation and coding scheme (MCS) level of the uplink terminal,
wherein the determining of the transmission power or the MCS level comprises determining an MCS level of each of a plurality of messages divided by the uplink terminal in response to the uplink terminal using a rate split scheme.

20. A base station comprising:
a selector configured to select an uplink terminal to perform an uplink communication and a downlink terminal to perform a downlink communication;
an allocator configured to allocate a radio resource for the uplink terminal and a radio resource for the downlink terminal; and
a processor configured to perform the uplink communication with the uplink terminal and the downlink communication with the downlink terminal using the respective allocated radio resources,
wherein the radio resource for the uplink terminal at least partially and simultaneously overlaps the radio resource for the downlink terminal in both time and frequency; and
a decision unit configured to determine a transmission power or a modulation and coding scheme (MCS) level of the uplink terminal,
wherein the determining of the transmission power or the MCS level comprises determining an MCS level of each of a plurality of messages divided by the uplink terminal in response to the uplink terminal using a rate split scheme.

21. The base station of claim 20, wherein the selector selects the uplink terminal and the downlink terminal based on interference between a plurality of terminals comprising the uplink terminal and the downlink terminal, or a balance between a volume of uplink communication traffic and a volume of downlink communication traffic, or an achievable capacity of each of the uplink communication and the downlink communication, or any combination thereof.

22. The base station of claim 20, wherein the selector selects the uplink terminal and the downlink terminal based on information regarding a channel formed between each of the terminals and the base station, or a characteristic of traffic corresponding to each of the terminals, or a location of each of the terminals, or a mobility of each of the terminals, or interference occurring in a receive antenna installed in the base station due to a transmit antenna installed in the base station, or information regarding interference channels formed between the terminals, or any combination thereof.

23. The base station of claim 20, further comprising a decision unit configured to determine a transmission power or a modulation and coding scheme (MCS) level of the uplink terminal.

24. The base station of claim 20, further comprising a generator configured to generate control information comprising information regarding the respective allocated radio resources.

25. The base station of claim 20, further comprising an echo cancellation unit configured to perform an echo cancellation to substantially cancel interference occurring in a receive antenna installed in the base station due to a transmit antenna installed in the base station.

26. A downlink terminal to perform a downlink communication with a base station, the downlink terminal comprising:
a receiver configured to receive a reference signal from an uplink terminal;
a measurement unit configured to measure an interference channel formed between the uplink terminal and the downlink terminal based on the reference signal;
a transmitter configured to transmit, to the base station, information regarding the measured interference channel so that the base station selects, from a plurality of terminals, an uplink terminal to perform an uplink communication and the downlink terminal to perform the downlink communication; and
a processor configured to recognize a radio resource for the downlink terminal based on control information comprising information regarding the radio resource for the downlink terminal received from the base station, and to perform the downlink communication with the base station using the radio resource for the downlink terminal,
wherein a radio resource for the uplink terminal at least partially and simultaneously overlaps the radio resource for the downlink terminal in both time and frequency, and
wherein the control information further comprises information regarding whether the uplink terminal is to use a rate split scheme, and information regarding a modulation and coding scheme (MCS) level of each of a plurality of messages divided by the uplink terminal in response to the uplink terminal using a rate split scheme.

27. An uplink terminal to perform an uplink communication with a base station, the uplink terminal comprising:
a transmitter configured to transmit a reference signal to a downlink terminal so that the downlink terminal measures an interference channel formed between the uplink terminal and the downlink terminal;
a receiver configured to receive, from the base station, control information regarding a radio resource for the uplink terminal in response to the base station selecting, from a plurality of terminals based on the measured interference channel, the uplink terminal and the downlink terminal; and
a processor configured to perform the uplink communication with the base station using the radio resource for the uplink terminal,
wherein the radio resource for the uplink terminal at least partially and simultaneously overlaps a radio resource for the downlink terminal in both time and frequency, and
wherein the control information further comprises information regarding whether the uplink terminal is to use a rate split scheme, and information regarding a modulation and coding scheme (MCS) level of each of a plurality of messages divided by the uplink terminal in response to the uplink terminal using a rate split scheme.

* * * * *